June 20, 1972 TAKASHI OCHI 3,671,360
APPARATUS FOR FORMING HOLLOW TUBE
Filed May 5, 1970 3 Sheets-Sheet 1

INVENTOR.
TAKASHI OCHI
BY
*McGlew & Toren*
ATTORNEYS

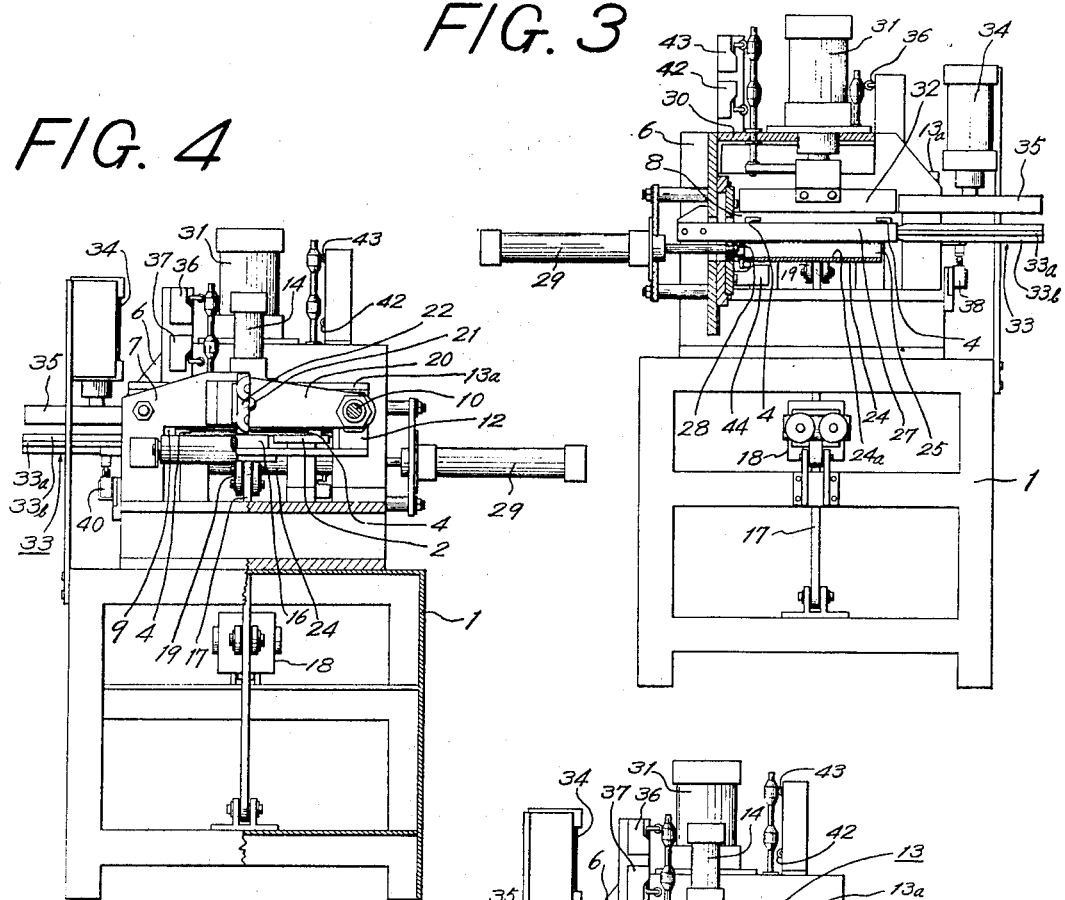

June 20, 1972  TAKASHI OCHI  3,671,360
APPARATUS FOR FORMING HOLLOW TUBE
Filed May 5, 1970  3 Sheets-Sheet 3
FIG. 6
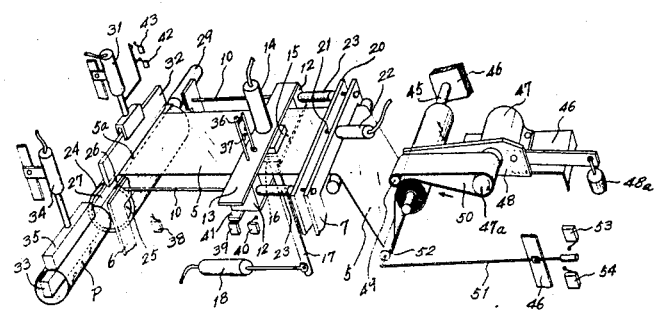
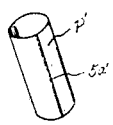
FIG. 7
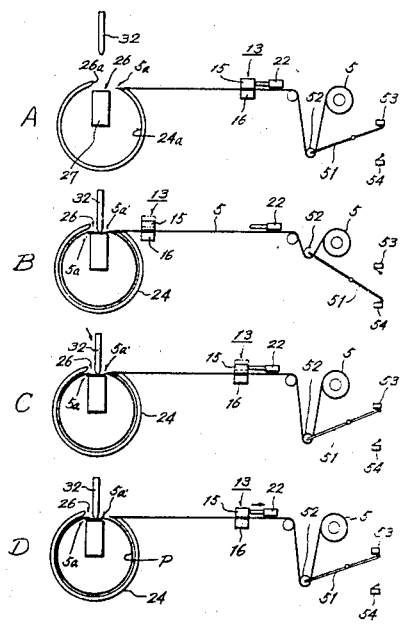
INVENTOR.
TAKASHI OCHI
BY
*Mc Glew & Toren*
ATTORNEYS United States Patent Office
3,671,360
Patented June 20, 1972

3,671,360
APPARATUS FOR FORMING HOLLOW TUBE
Takashi Ochi, Suwahara-Danchi, Japan, assignor to Yayo Plastic Yoki Co., Ltd., Tokyo, Japan
Filed May 5, 1970, Ser. No. 34,646
Int. Cl. B29d 23/10
U.S. Cl. 156—466                 2 Claims

ABSTRACT OF THE DISCLOSURE

An apparatus for forming hollow tubes wherein a film sheet of resilient and thermo-soluble synthetic resin material is fed into a cylinder body through an elongated axial slot provided on a barrel portion of the cylinder body, and after the film sheet is curled along an inner wall of the cylinder body and its leading edge is overlapped with one side of the film sheet the leading edge is welded to the film sheet and finally the film sheet is sheared at the welded portion.

BACKGROUND OF THE INVENTION

This invention relates to an apparatus for forming a hollow tube from a sheet of resilient, thermo-soluble synthetic resin such as hard vinyl chloride.

In the past, when forming a hollow tube from such material, a sheet of vinyl chloride sheared into a square shape is first curled to a cylindrical shape by a manually operated curing device and then the joining edges of the sheet are welded together. Thus, this process is not suitable to automated mass-production system and it is difficult to eliminate small error in the diameter of the hollow tube due to artificial error during the manufacturing process. As a result, when a closure is to be mounted on the hollow tube thus formed, the closure frequently is not closely fitted into the tube. Furthermore, since the size of blank sheet is constant as defined by a sheet manufacturer it is necessary to shear the blank sheet in order to form a hollow tube of predetermined diameter, which requires additional manpower for shearing and a substantial loss of raw material due to the shearing.

SUMMARY OF THE INVENTION

It is an object of this invention to accomplish mass-production of hollow tubes of uniform diameter by providing an apparatus for automatically forming such hollow tubes.

It is another object of this invention to eliminate manpower required for shearing and material loss due to shearing by forming each hollow tube from a predetermined length of sheet segment cut out of a continuous sheet of hard vinyl sheet.

According to a preferred embodiment of the invention, the apparatus comprises a cylindrical body having an elongated axial slot on its outer wall, sheet material feeding means for passing a continuous sheet of resilient and thermo-soluble material through said slot into the cylindrical body by a predetermined length for each step to cause the sheet to closely abut against the inner surface of the cylindrical body with the aid of resiliency of the sheet material and for causing the leading edge of the sheet to overlap on one side of the sheet material at the slot position, heating means extended into the slot for welding the overlapped portions of the sheet and tension means for applying tensile force to the sheet while the sheet material is heated and softened by said heating means, whereby shearing the sheet at the edge of welded portion.

The foregoing and other objects, features and advantages of the invention will be apparent from the following more particular description of the preferred embodiments of the invention, as illustrated in the accompanying drawings.

BRIEF DESCRIPTION OF THE DRAWINGS

In the drawings:
FIG. 3 is a front view thereof;
FIG. 4 is a rear view with portions broken away;
FIG. 5 is a longitudinal rear view taken along the line X—X of FIG. 1;
FIG. 6 is an exploded perspective view showing the construction of the apparatus of this invention;
and
FIGS. 7A, 7B, 7C, and 7D illustrate various steps during the operation of the apparatus of this invention.

DESCRIPTION OF THE PREFERRED EMBODIMENT

Figure 1:
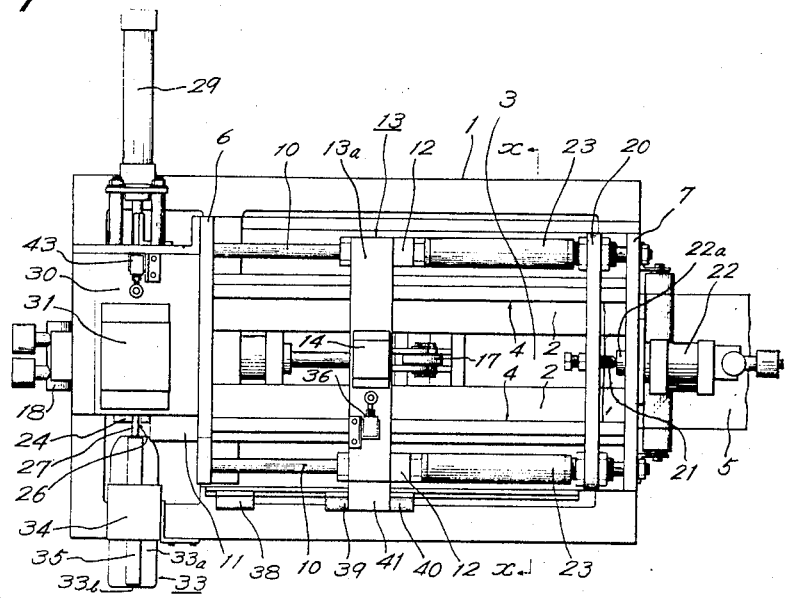
FIG. 1 is a plan view of the apparatus according to the invention.

Referring now to the drawings, a frame 1 is shown in FIGS. 1 through 5 having parallel long guide plates 2, 2 extending from back to front mounted on its upper side, defining a space 3 between the guide plates. The guide plates 2, 2 have guide grooves 4, 4 formed in their opposing sides, into which guide grooves both side edges of a sheet material 5 of hard vinyl chloride are fitted. The sheet material 5 is withdrawn, as shown in FIG. 6, from a free edge of a roll of continuous sheet and longitudinal opposite end edges of the sheet are fitted into the guide grooves 4, 4 while applying tension of predetermined strength. In this way the sheet material 5 extends to cover the space 3 over the guide plates 2, 2. To this end the guide plates 2, 2 are preferably mounted to the frame 1 in such a manner that the guide plates are movable towards or away from each other. Thus, the position of the guide plates can be adjusted in accordance with the width of the sheet material 5.

Fixed to the frame 1 are upstanding front support plate 6 and rear support plate 7 positioned longitudinally forward and backward, respectively, of the guide plates 2, 2. At the center of each of the supporting plates there is provided an opening 8 or 9, respectively, which permits the passage of the sheet material 5.

Mounted to the side end portions of the supporting plates 6, 7 are rods 10, 10 which are positioned above the guide plates 2, 2. The opposite ends of the rods are fixed to the front and rear supporting plates to support the rods parallel to each other. A receiving plate 11 is provided in front of the front support plate 6, the plate 11 communicating with the surface of the guide plate 2. The plate 11 and the guide plate communicate with each other through the opening 8 of the front support plate 6.

Mounted to the rods 10, 10 are sliding members 12, 12 on the upper side of which an upper base plate 13a is fixed transversely to the guide plates 2, 2 at a level above the guide plates. On the lower side of the sliding member a lower base plate 13b which is parallel with the upper base plate 13a, is fixed at a level below the guide plates. The upper and lower base plates constitutes a moving frame 13.

An air cylinder 14 is mounted on the upper base plate 13a and a lifting member 15 which is moved up and down to the sheet material 5 by the air cylinder is also mounted. On the other hand, mounted on the lower base plate 13b is a receiving member 16 positioned within the space 3 between the guide plates and facing to the lifting member 15 through the sheet material. The lifting member and the receiving member constitute a clumper.

Figure 2:
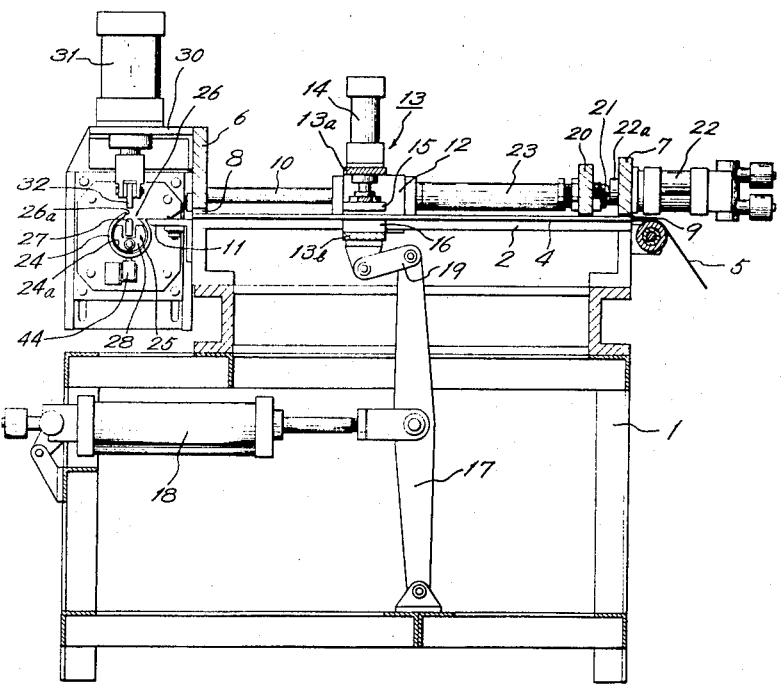
FIG. 2 is a longitudinal side elevational view thereof.

The receiving member 16 is fixed to the lower base plate 13b such that it makes light contact with the lower side of the sheet material 5. It is further connected to the air cylinder 18 arranged below the frame 1 through a link lever 17, whereby the receiving member 16 is moved with the moving frame 13 to and fro within the space 3 in response to the motion of the air cylinder 18. The link lever 17 is preferably connected, as shown in FIG. 2, to the receiving member 16 through a pivot member 19 to allow horizontal displacement of the receiving member 16. In front of the rear supporting plate 7, a stopper plate 20 is mounted with its opposite ends slideably mounted to the rods 10, 10. At the center of the stopper plate 20 an adjustment screw 21 is threaded with its end projecting to the rear support plate 7. On the rear surface of the rear support plate 7 there is provided an air cylinder 22 whose piston rod 22a projects from a bore provided in the rear support plate to press the adjustment screw 21. The air cylinder 22 serves to normally press the screw 21 forwardly to hold the stopper plate 20 in its advancing position, and to retract the piston rod to slightly retract the stopper plate 20. Between the stopper plate 20 and the moving frame 13, tubular separators 23, 23 fitted onto the rods 10, 10 are interleaved. Since the separator 23 serves to define a reciprocal stroke of the moving frame 13 it is desired to prepare longer and shorter cylindrical bodies so that either one is selected as the case may be.

In front of the receiving plate 11 arranged in front of the front support plate 6, a metallic cylinder 24 is arranged with its barrel portion contacting to front edge of the receiving plate in parallel relationship and the barrel portion protruding somewhat beyond the level of the receiving plate. The cylinder is opened at one end which serves as an exit opening 25, and has an elongated axial slit 26 at the position where the cylinder makes contact with the surface of the receiving plate 11. The slit is formed such that it opens upwardly, as well.

The edge 26a of the slit 26 opposing to the receiving plate is at a higher level than the surface of the receiving plate so that the upper portion of the cylinder inner wall adjacent to the edge 26a of the slit forms a barrier in front of the receiving plate.

Provided within the cylinder 24 are a heater support 27 protruding axially of the cylinder so as not to make contact with the inner wall 24a of the cylinder and a discharge plate 28 axially sliding in the cylinder while making light contact with the inner wall of the cylinder. The discharge plate 28 is normally retracted to the cylinder end opposite to the discharge end of the cylinder and caused to reciprocally slide within the cylinder by the air cylinder 29, as shown in FIG. 3.

Provided above the cylinder is a seat 30 to which an air cylinder 31 is fixed. Mounted on the air cylinder 31 is a heater plate 32 which is moved up and down by the air cylinder 31 and which moves into the cylinder body from the slot 26 thereof during downward movement to be pressed against the heater support 27. Coupled to the heater plate 32 is a high frequency power supply, not shown.

Arranged outwardly of the discharge opening 25 of the cylinder body 24 are a cooling bar 33 extending axially of the cylinder body so that it is connected to the heater support 27, an air cylinder 34 mounted above the cooling bar and an air jet plate 35 which is moved up and down by the air cylinder 34 and which is pressed against the upper surface of the cooling bar during the downward movement to jet cold compressed air to the cooling bar.

It is desired to combine the relatively wide lateral plate 33a and the relatively lower longitudinal bar 33b in cross relationship, as shown in FIGS. 1 and 3 to insure that the cooling bar forms a plastic hollow tube discharged from the cylinder body into an ellipse shape having its longer axis in a lateral direction.

Switches 36, 37 which are opened or closed through the movement of the lift member 15 are attached to the moving frame 13. The switch 36 is actuated upon the upward movement of the lift member 15 and serves in operation to operate the cylinder 18 to retract the moving frame 13 toward the rear support plate 7 while the switch 37 is actuated during the downward movement of the lift member 15 and, when actuated, serves to advance the moving frame 13 until the frame is brought into close contact with the front support plate 6.

On the side of the frame 1, switches 38, 39 and 40, which are opened or closed by the advance or retract movement of the moving frame 13, are mounted. These switches are arranged to be actuated by a projection 41 projecting from the moving frame 13. The switch 38 of the group of switches which is closest to the front support plate 6 is actuated by the projection 41 when the moving frame 13 is advanced to a predetermined stop position, and when actuated it operates the air cylinder 31 to move down the heater plate 32. Since the switch 38 is operated at the advance position of the moving frame 13 it is normally fixed to the frame 1. In some instances the switch 38 may be arranged to stop the advancing movement of the moving frame through the actuation by the moving frame 13. Other switches 39, 40 of the group of switches are arranged to be operated by the projection 41 when the moving frame 13 is retracted. The switch 39 is arranged to be operated when the moving frame 13 abuts against the separator 23 to be stopped by its movement, and when operated it actuates the air cylinder 14 of the moving frame 13 to move down the lifting member 15, to thereby put the sheet material 5 extending to cover the space 3 between the lifting member 15 and the receiving member 16. A high frequency power supply is connected to the heater plate 32 to accomplish high frequency heating. The switch 39 also serves to actuate the air cylinder 22 to retract its piston rod 22a in order to retract the stopper plate 20.

The switch 40 is arranged to be actuated by the projection 41 of the moving frame 13 when the frame 13 is retracted by a small stroke through the retraction of the stopper plate 20, and when actuated it operates the cylinder 31 to move up the heater plate 32.

With such arrangement of the switches, when the lifting member 15 moves down the switch 37 is actuated. Since this switch is arranged not to be operated until a reset switch described later is operated, the moving frame is not advanced at the stage.

Provided on the seat 30 on which the heater plate 32 is mounted are switches 42, 43 which are operated by the upward and downward movement of the heater plate. The switch 42 which is operated by the downward movement of the heater plate 32 is arranged, when operated, to actuate the air cylinder 14 to move up the lifting member 15 of the moving frame 13, while the switch 43 which is to be operated by the upward movement of the heater plate 32 is arranged, when operated, to actuate the air cylinder 34 of the cooling means for lifting its air jet plate 35 and to actuate the air cylinder 29 of the discharge means for reciprocating the discharge plate 28 within the cylinder body 24.

The cylinder body 24 includes a reset switch 44 which is operated when the discharge plate 28 is reciprocated and returned to its original position. This switch, when operated, serves to reset the parts in their original states. Thus, since the switch 37 is positioned in its operating position, the moving frame 13 restarts its forward movement and the air cylinder 22 which operates to press the stopper plate 20 again causes the protrusion of the piston rod 22a to advance the stopper 20, and the air cylinder 34 of the cooling means again moves down the air jet plate 35 to press it against the cooling plate 33.

In the above arrangement the feeding means of the sheet material 5 may be formed of any suitable means, although an example thereof is illustrated in the embodiment shown in FIG. 6.

The sheet material 5 is rotatably carried on a supporting shaft 45 in a rolled state. The supporting shaft is fixed to a frame 46 positioned in back of the rear supporting plate 7 and normally constructed to be self-rotatable. Mounted in back of the supporting frame 45, on the frame 46, is a motor 47, a shaft 47a of which extends in parallel with the supporting shaft. The motor has a pivot plate 48 mounted and at the tip end of the pivot plate there is provided a rotary shaft 49 extending in parallel with and above the rolled sheet material.

Attached to the shaft 47a of the motor and the rotary shaft 49 is a belt 50 of high frictional coefficient material such as rubber, the underside of the belt contacting to the upper surface of the rolled sheet material.

At the rear end of the pivot plate 48 a weight 48a of suitable weight is attached for reducing the weight at tip end of the pivot plate 48 so that the belt 50 presses against the rolled sheet material with suitable pressure.

The rolled sheet material has its free edge 5a withdrawn therefrom and inserted into the guide grooves 4, 4 of the guide plate 2, 2, and the sheet material is extended over the guide plate 2, 2 until the free edge reaches the slot 26 of the cylinder body 24. A pivot lever 51 is pivotably mounted to the frame 46 and a roller 52 of a suitable weight is attached to the end of the lever 51. The roller 52 is mounted on the upper surface of the sheet material between the frame 1 and the frame 46 thereby applying tension to the sheet material 5.

Mounted on the pivot lever 51 are two switches 53, 54 which are opened or closed by the pivotal movement of the pivot lever 51. The switch 53 which is to be operated during the downward movement of the roller 52 of the pivot lever serves, when operated, to stop the rotation of the motor 47, while the switch 54 which is to be operated during the upward movement of the roller 52 serves, when operated, to rotate the motor 47 in the direction indicated by the arrow and to move the belt 50 in the direction indicated by the arrow to unwind the rolled sheet material.

The operation of the apparatus of this invention will now be described with reference to FIGS. 7A to 7D. In the apparatus of the present invention, the rolled sheet material 5 is first unwound until the free edge 5a thereof approaches to the slot 26 in the cylinder body 24, and the longitudinal side edges of the sheet material are inserted into the guide grooves 4, 4 of the guide plates 2, 2 to extend the sheet material over the space 3 of the frame 1. At this stage of the operation, the moving frame 13 is at its retracted position as shown in FIG. 2 and the lifting member 15 is in up position. When a main operating switch, not shown, is closed the circuits in the apparatus are actuated and, as shown in FIG. 7A, the air cylinder 14 is operated to move down the lifting member 15. Preferably, these initial operations of the lifting member are performed through the main switch circuit independently of the switch means previously described.

When the lifting member 15 is moved down, the sheet material 5 is tightly held between the lifting member 15 and the receiving member 16, and the switch 37 of the moving frame 13 is actuated. Thus, the moving frame 13 is advanced towards the front support plate 6 and hence the sheet material 5 is fed forwardly. Since the inner wall of the cylinder body 24 forms a barrier to the direction of the sheet advancement, the free edge 5a of the sheet material 5 is curled along the inner wall 24a of the cylinder body 24 and finally the free edge 5a is joined to the underside of the sheet material 5 at the heater receiving plate 27.

If the advancing stroke of the moving frame is designed in such a manner that the moving frame 13 is stopped when the free edge 15a of the sheet material joins the underside of the sheet material 5, then the moving frame 13 will be stopped at the position shown in FIG. 7B to actuate the switch 38. When the switch 38 is closed, the heater plate 32 is moved down and, as shown in FIG. 7B, the sheet material 5 is pressed against the heater receiving plate 27 at the junction 5a'. When the heater plate 32 is moved down, the switch 42 is actuated and, therefore, the lifting element 15 is moved upwardly as shown by a dot and dash line in FIG. 7B to release the sheet material 5. When the lifting material 15 is moved up the switch 36 is actuated and the moving frame 13 is retracted. At this stage of the operation, since the sheet material 5 is tightly held between the heater plate 32 and the heater receiving plate 27, the sheet material, even after release from the lifting member 15, is held extended over the space 3 of the frame 1 without being retracted. Since the roller 52 is moved up as a result of the advancement of the sheet material 5, the pivot lever 51 of the sheet feeding means is pivoted to actuate the switch 54. Thus, the motor 47 of the feeding means is rotated to drive the belt 50 in the direction indicated by the arrow so that the sheet material 5 is unrolled. When the sheet material is unrolled the roller 52 is moved down and hence the pivot lever 51 is operated to actuate the switch 53.

As a result, the rotation of the motor 47 is stopped and the sheet material 5 is unwound by a predetermined length, which receives tension due to the weight of the roller 52. When the moving frame 13 is retracted as described above to abut against the separator 23, the moving frame 13 is prevented from further retraction and the projection 41 of the moving frame actuates the switch 39.

When the switch 39 is actuated, the lifting member 15 of the moving frame is moved down as shown by a solid line in FIG. 7C to again press the sheet material 5 to the receiving member 16, and a high frequency power supply is connected to the heater plate 32 and the piston rod 22a of the air cylinder 22 which holds the stopper plate 20 in its advancing position is retracted in the direction of the arrow in FIG. 7D.

Thus, at this stage of the operation, the sheet material 5 is tightly held between the lifting member 15 and the receiving member 16 and since the stopper plate 20 is released the sheet material 5 is tensioned by the retracting force of the moving frame 13. In this case, since the sheet material 5 is heated at the junction 5a' where it joins with its free edge 5a by the heater plate 32, the junction 5a' is welded together and the edge of the junction 5a' softened by heating is sheared as shown in FIG. 7D under the influence of the retracting force of the moving frame 13. Thus a plastic hollow tube P curled along the inner wall 24a of the cylinder body and welded together at the junction 5a' is left in the cylinder body 24. When the edge of the junction 5a' of the sheet material 5 is sheared, the moving frame 13 is retracted abruptly until it strikes against the stopper plate which is in its retracted position to actuate the switch 40. When the switch 40 is actuated, the heater plate 32 is raised and the plastic tube P curled within the cylinder body 24 is released with its welded junction 5a' exposed at the slot 26, and the switch 43 is operated through the upward movement of the heater plate 32.

As the switch 43 is actuated, the air cylinder 34 of the cooling means is operated to lift the air jet plate 35 and to actuate the air cylinder of the discharge means so that the discharge plate 28 reciprocates within the cylinder body 28. As the cylinder 28 reciprocates, the plastic tube P curled in the cylinder body 24 is passed from the discharge opening 25 to the cooling station 33 of the cooling means under the advancing movement of the discharge plate 28.

In this stage of the operation, since the plastic tube P is inserted into the cooling station 33 to be deformed into elliptic shape having longer lateral axis, the welded junction 5a' is brought into contact with the longitudinal member 33b of the cooling station, and another plastic tube P' which has been previously inserted into the cooling station 33 and cooled by the air jet plate 35 is extruded by the succeeding plastic tube P and discharged from the cooling means, as shown in FIG. 6. Since the discharge plate 28 is reset to its retracted position after passing the plastic tube P to the cooling station 33, the switch 44 is actuated by this operation.

Thus, all circuits of the apparatus are reset and the cylinder body 24 is emptied, and hence the switch 37 which is in operating position causes restart of the advancing movement of the moving frame 13, and the stopper plate 20 is extruded by the piston rod 22a of the air cylinder 22, and simultaneously the air jet plate 35 of the cooling means is pressed to the welded junction 5a' of the plastic tube P to cool it.

As the moving frame advances, the apparatus repeats the operation described above so that the sheet material 5 is again fed into the cylinder body 24 and the free edge thereof is joined with the underside of the sheet material 5 and then welded together and sheared upon the retraction of the moving frame 13, as described above. The plastic tube which has previously been inserted into the cooling station is now ejected as stated above. Thus, in the operation of the apparatus, the sheet material extending over the frame 1 is incremented by a predetermined length and, in so doing, the plastic tubes are sequentially ejected from the cooling station.

With these arrangements of the apparatus, economic mass-production is easily possible because the plastic tubes are manufactured in a fully automated manner. Also uniform products are produced because the plastic tubes are formed mechanically, not manually. Further, since continuous raw sheet material can be used the man-power required for shearing is saved and shear loss is completely eliminated.

While the invention has been particularly shown and described with reference to a preferred embodiment thereof, it will be understood by those skilled in the art that various changes in form and details may be made therein without departing from the spirit and scope of the invention.

Having described the preferred embodiment of the invention, what is claimed is:

1. An apparatus for forming hollow tubes comprising; a frame, guide plates extending over said frame and parallel to each other and defining a space therebetween, sheet material feeding means for feeding a continuous sheet material of resilient and thermo-soluble synthetic resin from a roll of the sheet material positioned in back of said frame over said guide plates with its longitudinal edges mounted on said respective guide plates, a moving frame mounted on the upper portion of said frame, said moving frame is movable reciprocally within a predetermined distance along the forward direction of said space, said moving frame including a receiving member positioned in said space and a lifting member which is pressed against said receiving member when said moving frame is advanced and moved away from said receiving member when said moving frame is retracted, a cylinder body having an axial slot on its barrel surface and an open end which serves as a discharge opening, said cylinder body is arranged in front of and transversely of said guide plates so that a free edge of the sheet material can be passed into the slot of said cylinder body, said cylinder body including therein a heater receiving plate axially projecting so as not to contact with the inner wall of the cylinder body and a discharge plate reciprocally movable within the cylinder body while making light contact with the inner wall thereof and normally positioned at the end of the cylinder body opposite to said discharge end, a heater plate mounted above said cylinder body, which is moved upward away from said heater receiving plate during the advancement of the moving frame and passed into the cylinder body through the slot to press against said heater receiving plate during the retraction of said moving frame, start switch means for moving down the lifting member of the moving frame at its original position and advancing the moving frame, means for stopping the advancing movement of the moving frame when the sheet material fed by the advancement of the moving frame is curled in the cylinder body and its free edge is joined and overlapped with the inner surface of the sheet material as said heater receiving plate, switch means for moving down said heater plate after the stop of advancement of said moving frame to press said heater plate against the junction of the sheet material and for lifting said lifting member of said moving frame, said switch means for resetting said moving frame to its original position after lifting of said lifting member and moving down said lifting member to hold the sheet member therebetween when said moving frame is retracted to its original position.

2. An apparatus, as set forth in claim 1, wherein a stopper plate is arranged for releasing said moving frame to retract it abruptly by a slight stroke after the sheet material is held, switch means for raising said heater plate after the abrupt retraction of said moving frame, switch means for reciprocating said discharge plate within said cylinder body after raising said heater plate, and reset switch means operated by the resetting of said discharge plate for resetting the entire apparatus to restart the advancement of said moving frame.

References Cited

UNITED STATES PATENTS

| | | | |
|---|---|---|---|
| 3,510,378 | 5/1970 | Kramer | 156—466 |
| 3,060,075 | 10/1962 | Kincaid | 93—Heat Seal |
| 3,424,069 | 1/1969 | Geisler | 93—77 |
| 3,388,017 | 6/1968 | Grimsley et al. | 156—466 |
| 2,685,829 | 10/1954 | Taber | 156—218 |
| 2,912,398 | 11/1959 | Johnson et al. | 156—218 X |
| 3,338,142 | 8/1967 | Simpson et al. | 156—218 |

BENJAMIN A. BORCHELT, Primary Examiner

H. TUDOR, Assistant Examiner

U.S. Cl. X.R.

93—77; 156—217

UNITED STATES PATENT OFFICE
CERTIFICATE OF CORRECTION

Patent No. 3,671,360                     Dated June 20, 1972

Inventor(s) Takashi Ochi

It is certified that error appears in the above-identified patent and that said Letters Patent are hereby corrected as shown below:

In the heading of the patent, the name of the assignee should read:

--Yayoi Plastic Yoki Co., Ltd.--

Signed and sealed this 3rd day of April 1973.

(SEAL)
Attest:

EDWARD M. FLETCHER, JR.                ROBERT GOTTSCHALK
Attesting Officer                      Commissioner of Patents